W. H. HOWSLEY, Jr.
SPRING WHEEL.
APPLICATION FILED FEB. 19, 1912.
1,029,299.
Patented June 11, 1912.
2 SHEETS—SHEET 1.
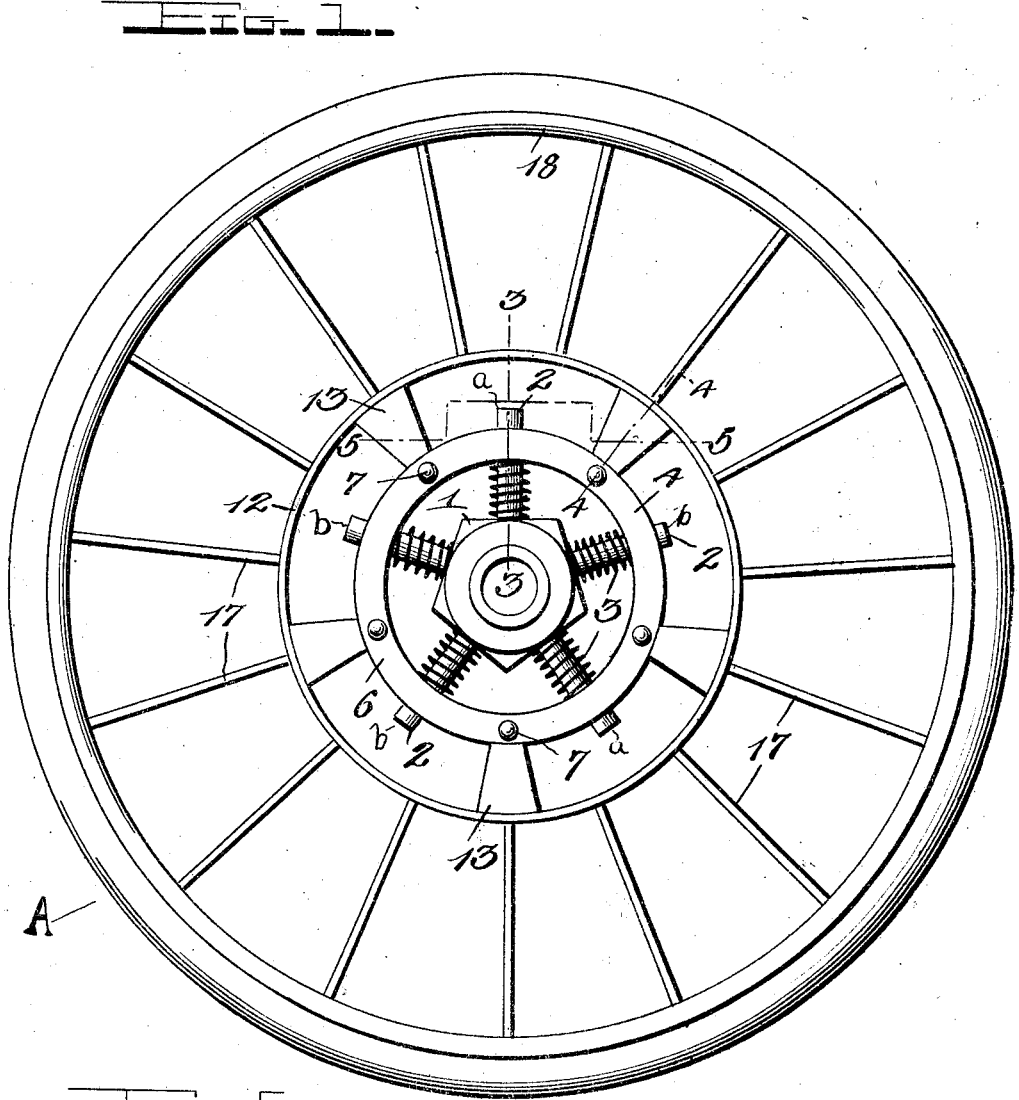
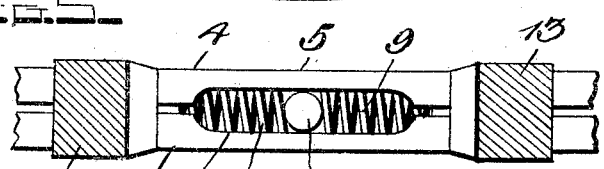
Witnesses
Chas. L. Gricetauer.
A. B. Norton.
Inventor
W. H. Howsley, Jr.,
By Watson E. Coleman,
Attorney

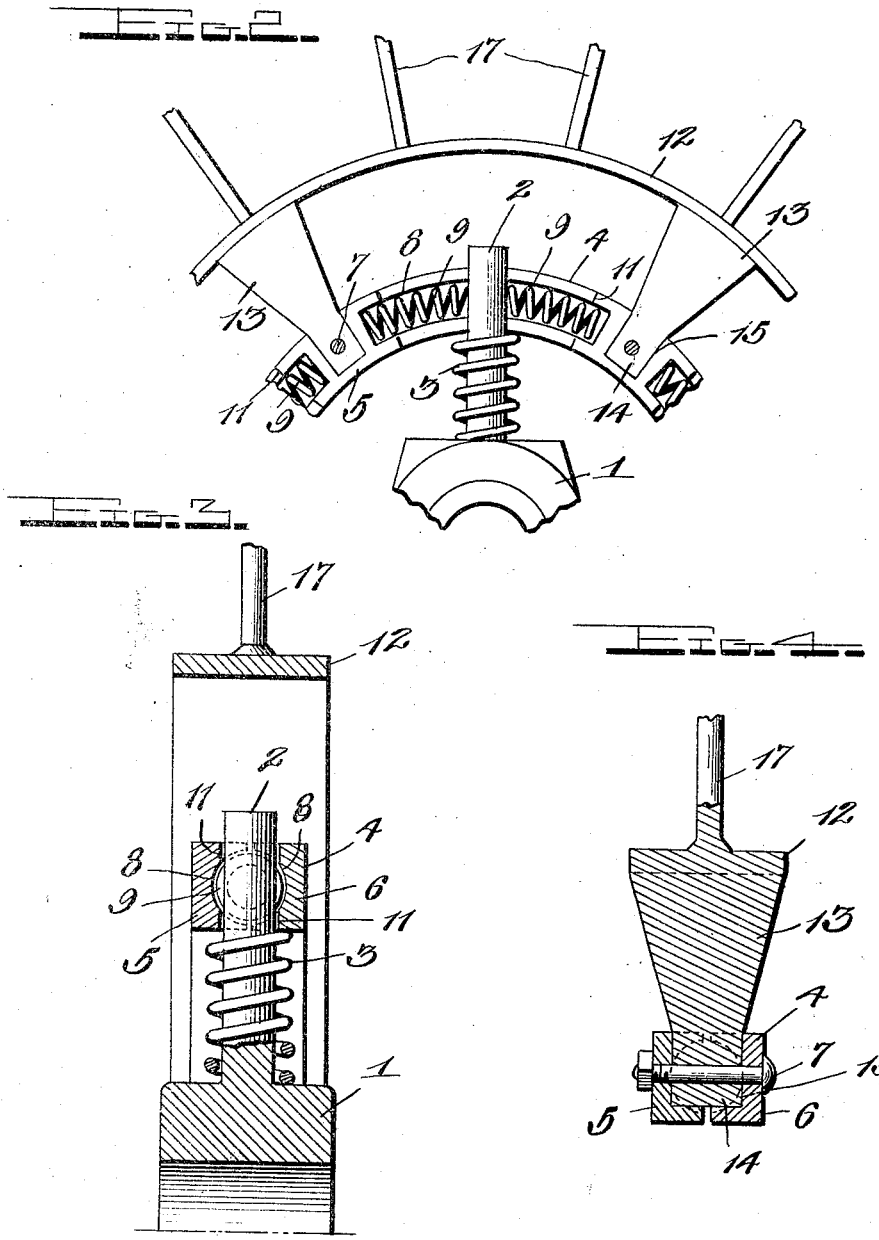

UNITED STATES PATENT OFFICE.

WILLIAM H. HOWSLEY, JR., OF ADAMS, TENNESSEE.

SPRING-WHEEL.

1,029,299.	Specification of Letters Patent.	Patented June 11, 1912.

Application filed February 19, 1912. Serial No. 678,523.

*To all whom it may concern:*

Be it known that I, WILLIAM H. HOWSLEY, Jr., a citizen of the United States, residing at Adams, in the county of Robertson and State of Tennessee, have invented certain new and useful Improvements in Spring-Wheels, of which the following is a specification, reference being had to the accompanying drawings.

This invention relates to new and useful improvements in vehicle wheels and has for its object to provide a vehicle wheel in which the hub is suspended within the rim upon springs to absorb all shock and jar caused by passing over uneven surfaces.

Another object of the invention is to provide a vehicle wheel of this character which will possess advantages in points of efficiency and durability, is inexpensive of manufacture and at the same time is simple in construction and operation.

With the above and other objects in view, the invention consists in the novel features of construction and the combination and arrangement of parts hereinafter more fully described, pointed out in the claims and shown in the accompanying drawings, in which—

Figure 1 is a side elevation of a vehicle wheel constructed in accordance with my invention; Fig. 2 is a detail vertical sectional view; Fig. 3 is a sectional view on the line 3—3 of Fig. 1; Fig. 4 is a sectional view on the line 4—4 of Fig. 1; Fig. 5 is a sectional view on the line 5—5 of Fig. 1.

Referring more particularly to the drawings 1 indicates the hub having a plurality of radial guide pins 2 projecting therefrom. Mounted on these pins 2 are the coil springs 3 which are disposed between the hub 1 and the annular member 4. This member 4 is formed in two sections 5 and 6 which are rigidly secured together by means of the screw bolts 7. The sections 5 and 6 are provided with the semicircular grooves 8 adapted to receive the coil springs 9 which are arranged between the pins 2.

A concentric rim 12 is provided which is spaced from the annular member 4 by means of the spacing blocks 13, said blocks being formed integral with the rim 12 and having their free ends reduced as shown at 14 and adapted to be disposed in the openings 15 in the annular member 4, said blocks being secured to the member 4 by means of the screw bolts 7 passing through said member and through the blocks 13. Elongated slots 11 are formed in the members 5 and 6 and adapted to receive the pins 2 to permit of the relative movement of said pins.

Secured to the rim 12 are the radially extending spokes 17 having the felly 18 secured to their outer ends.

From the foregoing description taken in connection with the drawings it will be seen that if the wheel strikes an object at the point A the springs 3 on the pins 2 indicated *b* will be compressed by the outward movement of the pins, the pins 2 also bearing against and compressing the springs 9 which the pins 2 as indicated at *a* will only bear against the springs 9 which will relieve the vehicle from any shock or jar.

While I have shown and described the preferred form of my invention it will be obvious that various changes in the details of construction and the proportions may be resorted to for successfully carrying my invention into practice without sacrificing any of the novel features or departing from the scope thereof.

Having thus described my invention what is claimed is:

1. In a vehicle wheel, the combination of a hub, a plurality of radial guide pins projecting therefrom, an annular member arranged in spaced relation with the hub, said member having a plurality of elongated openings to receive said pins, coil springs mounted on said pins and disposed between said member and hub, said annular member being formed in sections, said sections having semi-circular grooves formed therein, coil springs circumferentially arranged in said grooves and disposed between said pins, a concentric rim arranged in spaced relation with the annular member, and spacing blocks arranged between said rim and annular member having their inner ends secured between the sections of the annular member, radial spokes projecting from said rim, and a felly secured to the outer ends of said spokes.

2. In a vehicle wheel, the combination of a hub, a plurality of radial guide pins projecting therefrom, an annular member arranged in spaced relation with said hub, springs mounted on said pins and arranged between said member and hub, said member having elongated openings to receive said pins, said annular member being formed in sections, having semicircular grooves formed in their inner faces, coil springs arranged in said grooves and disposed between said pins, a concentric rim arranged in spaced relation with said annular member, spacing blocks formed on said rim and arranged between said rim and annular member, said blocks having reduced inner ends and said annular member having openings formed therein and arranged between the guide pins to receive the reduced end of said spacing blocks, radial spokes projecting from said rim, and a felly secured to the outer ends of said spokes.

In testimony whereof I hereunto affix my signature in the presence of two witnesses.

WILLIAM H. HOWSLEY, JR.

Witnesses:
C. G. PRIDE,
T. W. SMITH.

Copies of this patent may be obtained for five cents each, by addressing the "Commissioner of Patents, Washington, D. C."